US012619187B2

(12) United States Patent
Mutsuno et al.

(10) Patent No.: US 12,619,187 B2
(45) Date of Patent: May 5, 2026

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventors: Masahiro Mutsuno, Tokyo (JP); Satoshi Totsuka, Ibaraki (JP); Tsuyoshi Muto, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/896,416

(22) Filed: Sep. 25, 2024

(65) Prior Publication Data

US 2025/0102988 A1 Mar. 27, 2025

(30) Foreign Application Priority Data

Sep. 25, 2023 (JP) ................................ 2023-161601

(51) Int. Cl.
*G03G 15/00* (2006.01)

(52) U.S. Cl.
CPC ..... *G03G 15/6558* (2013.01); *G03G 15/5016* (2013.01); *G03G 15/5029* (2013.01); *G03G 2215/00734* (2013.01); *G03G 2215/00738* (2013.01); *G03G 2215/00742* (2013.01)

(58) Field of Classification Search
CPC ............ G03G 15/5016; G03G 15/502; G03G 15/5029; G03G 15/6558; G03G 2215/00734; G03G 2215/00738; G03G 2215/00742; G03G 2215/00751
See application file for complete search history.

(56) References Cited

U.S. PATENT DOCUMENTS

| | | | | |
|---|---|---|---|---|
| 2007/0116486 A1* | 5/2007 | Katahira | G03G 15/502 | 399/82 |
| 2009/0003857 A1* | 1/2009 | Kuramochi | B65H 7/02 | 399/45 |
| 2014/0268234 A1* | 9/2014 | Iida | G06K 15/1882 | 358/1.15 |
| 2019/0302670 A1* | 10/2019 | Kitamura | G03G 15/5062 | |
| 2022/0019165 A1* | 1/2022 | Taki | G03G 15/5029 | |

FOREIGN PATENT DOCUMENTS

JP 2022026815 A 2/2022

* cited by examiner

*Primary Examiner* — Carla J Therrien
(74) *Attorney, Agent, or Firm* — Canon U.S.A., Inc. IP Division

(57) ABSTRACT

If a plurality of types of papers correspond to a feature value detected by a media sensor, an image forming apparatus automatically selects, on the basis whether a type of paper is defined by a user, one from among the plurality of types of papers.

6 Claims, 8 Drawing Sheets

FIG. 7

701 702

| BASIS WEIGHT \ SURFACE PROPERTY | PLAIN PAPER | COATED PAPER |
|---|---|---|
| 257-300g/$m^2$ | Thick paper7 (257-300g/$m^2$) | |
| 221-256g/$m^2$ | Thick paper 6 (221-256g/$m^2$) | Coat 3 (221-256g/$m^2$) |
| 181-220g/$m^2$ | Thick paper 5 (181-220g/$m^2$) | Coat 2 (164-220g/$m^2$) |
| 164-180g/$m^2$ | Thick paper 4 (164-180g/$m^2$) | |
| 151-163g/$m^2$ | Thick paper 3 (151-163g/$m^2$) | Coat 1 (106-163g/$m^2$) |
| 129-150g/$m^2$ | Thick paper 2 (129-150g/$m^2$) | |
| 106-128g/$m^2$ | Thick paper 1 (106-128g/$m^2$) (703)<br>Thick paper 1 (106-128g/$m^2$)_xx for business cards (704) | |
| 91-105g/$m^2$ | Plain paper 3 (91-105g/$m^2$) | |
| 80-89g/$m^2$ | Plain paper 2 (80-89g/$m^2$) | |
| 64-79g/$m^2$ | Plain paper 1 (64-79g/$m^2$) (707)<br>Plain paper 1 (64-79g/$m^2$)_xx for certificates (705)<br>Plain paper 1 (64-79g/$m^2$)_xx for FAX (706) | |
| 52-63g/$m^2$ | Thin paper (52-63g/$m^2$) | |

IMAGE FORMING APPARATUS, METHOD FOR CONTROLLING IMAGE FORMING APPARATUS, AND STORAGE MEDIUM

BACKGROUND

Field of the Disclosure

The present disclosure relates to an image forming apparatus, a method for controlling an image forming apparatus, and a storage medium.

Description of the Related Art

An image forming apparatus including a sensor (media sensor) that measures feature values, such as the surface property and the basis weight, of a sheet on a sheet feeding path has been developed. Such an image forming apparatus uses the media sensor to measure the feature values of a sheet being conveyed on the basis of a print job and identifies the type of the sheet from a prestored sheet database (media library) on the basis of the measured feature values of the sheet. The image forming apparatus then prints on the sheet using print control parameters corresponding to the identified type of sheet.

Japanese Patent Laid-Open No. 2022-26815 describes that a user sets the print control parameters for a user define paper (the type of paper set uniquely by the user) by duplicating the print control parameters for basic paper that is prepared in advance and changing the duplicate print control parameters. Japanese Patent Laid-Open No. 2022-26815 also describes that the user define paper is defined by measuring and identifying the type of basic paper that serves as the source of duplication for the user define paper using a media sensor and enabling the user to set the print control parameters of the basic paper.

However, according to the technique described in Japanese Patent Laid-Open No. 2022-26815, the image forming apparatus may not determine the sheet type at the time of printing, since the user uniquely sets the sheet type.

SUMMARY

Accordingly, the present disclosure prevents the happening of the occasion where an image forming apparatus cannot determine the type of sheet at the time of printing.

According to an aspect of the present disclosure, an image forming apparatus includes a detection unit configured to detect a feature value of a sheet being conveyed and a selection unit configured to select the type of sheet corresponding to the feature value detected by the detection unit, wherein when a plurality of types of sheets correspond to the feature value detected by the detection unit, the selection unit automatically selects one of the plurality of types of sheets.

Further features of the present disclosure will become apparent from the following description of exemplary embodiments with reference to the attached drawings.

BRIEF DESCRIPTION OF THE DRAWINGS

FIG. 7 illustrates the correspondence between the feature value and the type of paper.

DESCRIPTION OF THE EMBODIMENTS

Figure 1:
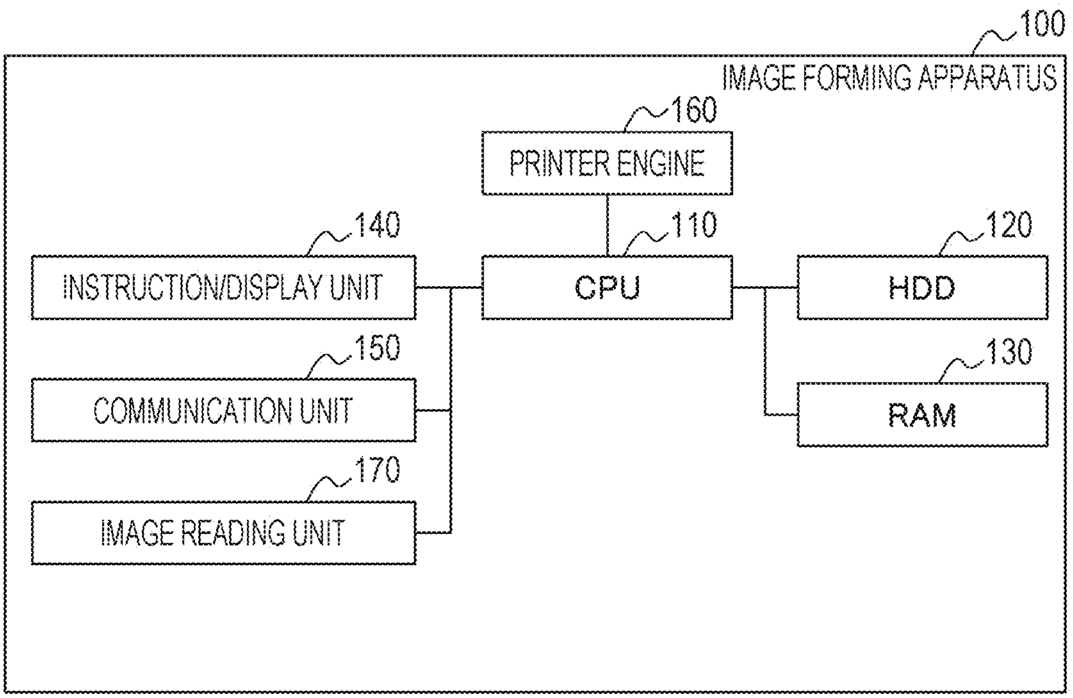
FIG. 1 is a schematic illustration of an image forming apparatus.

An embodiment of the present disclosure is described below with reference to the accompanying drawings. The embodiment described below is only an example, and the present disclosure is not limited to the embodiment described below. In the embodiment described below, the same reference numeral is used to identify the same configuration.

First Embodiment

The first embodiment is first described.

Description of Image Forming Apparatus

FIG. 1 schematically illustrates an example of the configuration of an image forming apparatus 100. In FIG. 1, a central processing unit (CPU) 110 is an example of a control unit that performs overall control of the image forming apparatus 100. The image forming apparatus 100 may have one or more dedicated hardware units different than the CPU 110, and the dedicated hardware units may perform at least some of the processes to be performed by the CPU 110. The dedicated hardware unit is, for example, an ASIC (application-specific integrated circuit), an FPGA (field programmable gate array), or a DSP (digital signal processor). The image forming apparatus 100 may have a hardware processor other than a CPU (for example, a GPU) instead of or in addition to the CPU 110.

An HDD (hard disk drive) 120 stores, for example, a control program and initial values of various setting values according to the present embodiment. The CPU 110 executes the control program according to the present embodiment read from the HDD 120 to perform the procedures for image formation and the procedure for the steps of each of flowcharts described below. The image forming apparatus 100 may include a nonvolatile storage medium other than the HDD 120 (for example, a ROM (read-only memory) and an SSD (solid-state drive)) in addition to or instead of the HDD 120. The RAM 130 stores a variety of types of information under the control of the CPU 110.

According to the present embodiment, the case in which a sheet to be printed is paper is described as an example. For this reason, the present embodiment is described with reference to, as an example, the case in which a paper type database is stored in a storage medium, and the paper type database stores paper information, such as a paper name (type name), a paper size, feature values of paper, print control parameters, and the paper category, for each of the types of paper. In the paper type database, the paper name (type name), paper size, feature values of paper, print control parameters (control parameters for image formation), and paper category are stored in associated with one another. The storage medium for storing the paper type database is, for example, at least one of the HDD 120 and a predetermined storage areas of the RAM 130. Alternatively, the paper type database may be stored in a storage device that is external to the image forming apparatus 100 and that can be referenced by the image forming apparatus 100. The sheet is not limited to paper. For example, the sheet may be paper other than flat paper (for example, an envelope), plastic film, such as an overhead projector (OHP) sheet, or cloth.

The paper category is information that can at least identify whether the paper is paper that is set as default in the image forming apparatus 100. For example, the paper category is information that indicates whether the paper is basic paper (described below) or user define paper.

The print control parameters are control parameters for forming an image on paper. For example, the print control parameters include a fixing temperature, an adjustment value of a secondary transfer voltage, and an adjustment value of the image position in the paper. The feature value of paper may be included in the print control parameters.

It is desirable that the RAM 130 be a rewritable memory that does not require an information refresh operation. When a user changes print control parameters corresponding to a certain type of paper, the CPU 110 adds (stores) the changed print control parameters to the paper type database as the print control parameters corresponding to the type of paper. The print control parameters are print control parameters set uniquely by the user. According to the present embodiment, the type of paper is also referred to as a "paper type" as necessary.

An instruction/display unit 140 has the function of displaying various types of information and the function of a user interface. The instruction/display unit 140 includes a display (for example, a touch panel) capable of displaying an operation screen, buttons, and the like. When a user inputs an instruction to start a printing operation or the like by operating, for example, the button provided on the instruction/display unit 140, the instruction/display unit 140 outputs instruction information indicating the details of the instruction to the CPU 110. However, for the user to input the instruction information for starting, for example, the printing operation to the image forming apparatus 100, it is not only way to operate the instruction/display unit 140 to input the information to the image forming apparatus 100. For example, the instruction information for starting the printing operation may be input to the image forming apparatus 100 from an external device (for example, a personal computer, a tablet, or a smartphone) connected via a network or the like (not illustrated).

A communication unit 150 includes a hardware interface for the image forming apparatus 100 to communicate with the external device.

A printer engine 160 performs a variety of operations to form an image on paper (that is, performs a printing operation) on the basis of instructions from the CPU 110. For example, when the instruction information to start a printing operation is input, the CPU 110 drives and controls a feed-conveyance motor of the printer engine 160 in accordance with the instruction information. The printer engine 160 feeds and conveys paper placed in a paper feeding unit. The CPU 110 also controls the formation (printing) of an image by the printer engine 160 by setting print control parameters for the printer engine 160. The printer engine 160 prints on the paper on the basis of the print control parameters set by the CPU 110.

An image reading unit 170 optically reads the information printed on the paper and converts the information into image data (digital data). The image reading unit 170 includes an image scanner. The CPU 110 performs a process to print, on paper, the image based on the image data obtained by the image reading unit 170.

Figure 2:
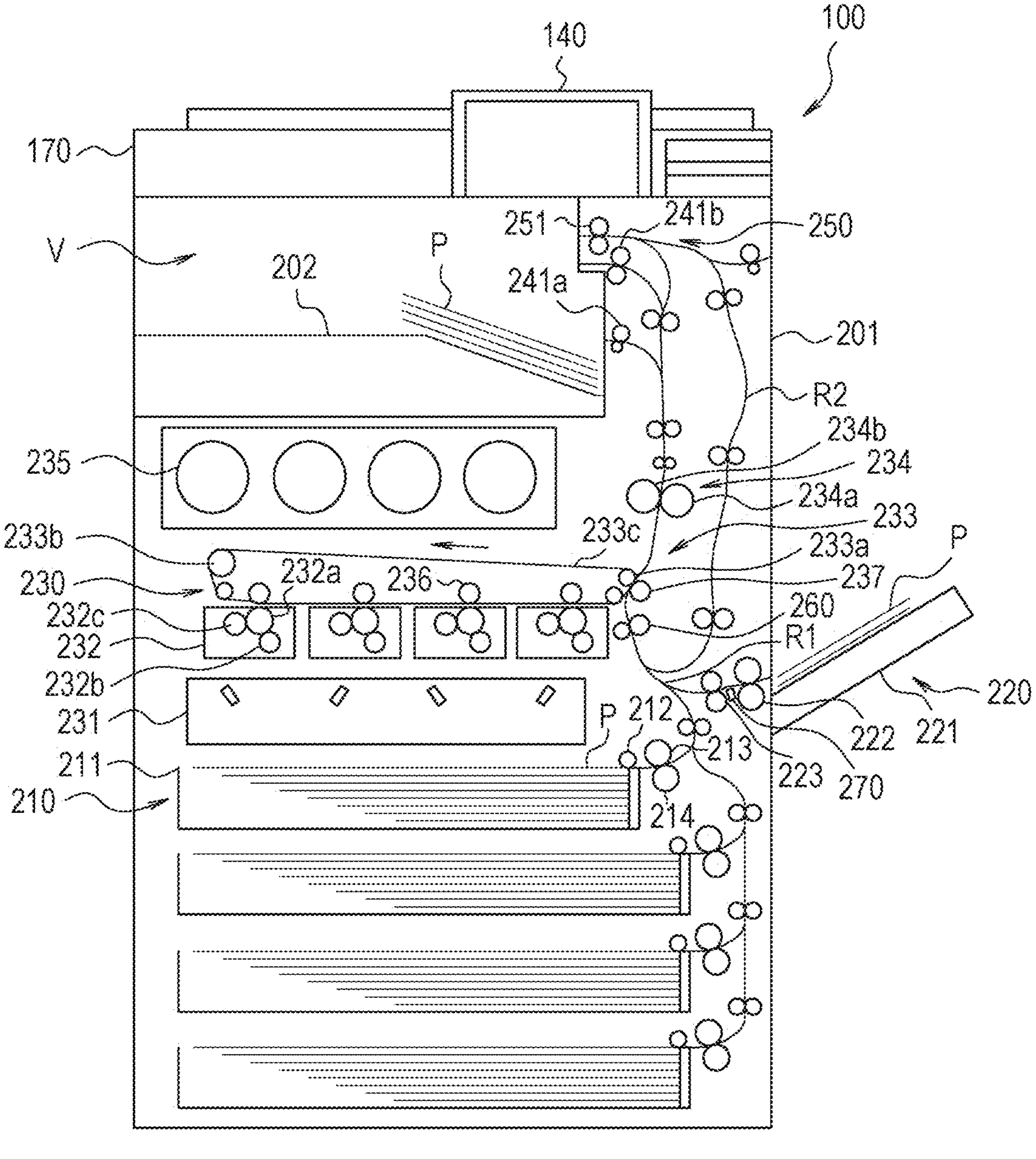
FIG. 2 illustrates the internal configuration of the image forming apparatus.

FIG. 2 illustrates an example of the internal configuration of the image forming apparatus 100.

In FIG. 2, the image reading unit 170 is mounted horizontally on top of an image forming apparatus main body 201. An output space V into which printed paper P is output is formed between the image reading unit 170 and the image forming apparatus main body 201. The printed paper P is stacked onto a stacking unit 202 protruding from the bottom of the output space V. The configuration in the image forming apparatus main body 201 illustrated in FIG. 2 is included in the printer engine 160 illustrated in FIG. 1, except for the paper P.

A cassette sheet feeding unit 210 conveys the paper P from a feed cassette 211. The cassette sheet feeding unit 210 includes a pickup roller 212, a feed roller 213, and a retard roller 214. For convenience of notation, only one cassette sheet feeding unit 210 has a reference numeral in FIG. 2. The pickup roller 212 feeds the paper P from the feed cassette 211.

The feed roller 213 and the retard roller 214 are rollers for separating the paper P fed from the pickup roller 212 and conveying the paper P to a paper conveying path R1.

A manual sheet feeding unit 220 conveys the paper P from a manual sheet feed tray 221. The manual sheet feeding unit 220 includes a feed roller 222 and a pull-out roller 223. Like the cassette sheet feeding unit 210, the manual sheet feeding unit 220 delivers the paper P from the manual sheet feed tray 221 to the paper conveying path R1, separates the delivered paper P, and conveys the paper P to the paper conveying path R1.

A registration roller pair 260 is provided in the paper conveying path R1 between each of the cassette sheet feeding unit 210 and the manual sheet feeding unit 220 and an image forming unit 230. The registration roller pair 260 corrects the skew of the paper P (that is, travelling of the paper P at an angle to the extension direction of the paper conveying path R1).

The image forming unit 230 is, for example, a four-drum full-color unit. The image forming unit 230 includes, for example, a laser scanner 231 and four process cartridges 232 to form a toner image in four colors (that is, yellow (Y), magenta (M), cyan (C), and black (K)). For convenience of notation, only one color (for example, yellow) process cartridge 232 has a reference numeral in FIG. 2.

Each of the process cartridges 232 includes a photoconductor drum 232*a*, a charger 232*b* serving as a charging unit, and a developing device 232*c* serving as a developing unit. The image forming unit 230 further includes a secondary transfer unit 233 and a fixing unit 234 provided above the process cartridge 232. A toner cartridge 235 is a cartridge for supplying toner to the developing device 232*c*.

The secondary transfer unit 233 includes a drive roller 233*a*, a tension roller 233*b*, and a transfer belt 233*c*. The transfer belt 233*c* is wound around the drive roller 233*a* and the tension roller 233*b*. A primary transfer roller 236 is provided inside of the transfer belt 233*c*. The primary transfer roller 236 is in contact with the transfer belt 233*c* at a position facing the photoconductor drum 232*a*. For convenience of notation, only one primary transfer roller 236 has a reference numeral in FIG. 2.

The transfer belt 233*c* is rotated in the direction of the arrow by the drive roller 233*a*, which is driven by a drive unit (not illustrated). A secondary transfer roller 237 is provided in the secondary transfer unit 233 at a position facing the drive roller 233*a*. The secondary transfer roller 237 transfers a color image formed on the transfer belt 233*c* onto the paper P. The fixing unit 234 is provided above the secondary transfer roller 237. The fixing unit 234 includes a pressure roller 234*a* and a heat roller 234*b*.

A first discharge roller pair 241*a*, a second discharge roller pair 241*b*, and a duplex printing reversing unit 250 are provided above the fixing unit 234. The duplex printing reversing unit 250 includes a reversing roller pair 251 that is capable of both forward and reverse rotation. The paper P having an image formed on one side is delivered by the reversing roller pair 251 to a re-conveying path R2 and is conveyed again to the image forming unit 230.

A display of the instruction/display unit 140 is provided on top of the image forming apparatus 100.

A media sensor 270 detects the feature values of the paper P from the paper P that is being conveyed (fed) (on the paper conveying path R1 in the example illustrated in FIG. 2). The feature values of the paper P are, for example, the surface property (the characteristics of the surface shape) and the basis weight. However, the feature values of paper are not limited thereto. For example, instead of or in addition to basis weight, the size (the lengths in the horizontal and vertical directions) and thickness may be included in the feature values of the paper P. An example configuration of the media sensor 270 is described in detail below with reference to FIG. 3.

While the internal configuration of the image forming apparatus 100 according to the present embodiment has been described above, the internal configuration of the image forming apparatus 100 described above is only an example, and the internal configuration is not limited thereto.

Operation Performed by Image Forming Apparatus

An example of the operation performed by the image forming apparatus 100 that forms an image on the paper P is described below. Upon receiving image data of a document to be printed, the CPU 110 first performs image processing on the image data. The CPU 110 converts the processed image data into electrical signals and transmits the electrical signals to the laser scanner 231 of the image forming unit 230. The surface of the photoconductor drum 232*a* that is uniformly charged to a potential of a predetermined polarity by the charger 232*b* is sequentially exposed by a laser beam output from the laser scanner 231. As a result, yellow, magenta, cyan, and black electrostatic latent images are sequentially formed on the photoconductor drums 232*a* of the process cartridges 232.

Thereafter, the electrostatic latent images are visualized by being developed using toner of the colors. The toner images of the colors on the corresponding photoconductor drums 232*a* are sequentially transferred to the transfer belt 233*c* in a superimposed manner by primary transfer biases applied to the primary transfer rollers 236. As a result, a toner image is formed on the transfer belt 233*c*. Simultaneously with the toner image forming operation, the paper P is conveyed one by one to the registration roller pair 260 by the cassette sheet feeding unit 210 or the manual sheet feeding unit 220. The skew of paper P is corrected by the registration roller pair 260. The paper P is then conveyed to the secondary transfer unit 233 by the registration roller pair 260. A secondary transfer bias is applied to the secondary transfer roller 237. As a result, the toner images formed on the transfer belt 233*c* are transferred to the paper P conveyed to the secondary transfer unit 233 in a single instance. The paper P having the toner image transferred thereon is conveyed to the fixing unit 234.

The paper P conveyed to the fixing unit 234 is subjected to heat and pressure in a roller nip section formed by the pressure roller 234*a* and the heat roller 234*b*. This melts the toner of each color on the paper P, causing the colors to mix and fixing a color image on the paper P. At this time, the adhesive force of the melted toner may cause the paper P to generate a sticking force to the heat roller 234*b*. If the stiffness (flexural rigidity) of the paper P is low, the paper P may be wound around the rotating heat roller 234*b*. For this reason, a separation plate (not illustrated) is provided downstream of the heat roller 234*b* to separate the paper P from the heat roller 234*b*. Thereafter, the paper P having the image fixed thereon is discharged into the output space V by the first discharge roller pair 241*a* and the second discharge roller pair 241*b* provided downstream of the fixing unit 234. The paper P discharged into the output space V is stacked onto the stacking unit 202 that protrudes from the bottom of the output space V. When images are formed on both sides of the paper P, the paper P is conveyed to the re-conveying path R2 by the reversing roller pair 251 after the image is fixed on one side (a front side) of the paper P. The paper P having the image formed on one side (the front side) is conveyed to the image forming unit 230 through the re-conveying path R2. Subsequently, an image is formed on the back side of the paper P in the same manner as described above.

The media sensor 270 is provided in the paper conveying path R1. The present embodiment is described with reference to, as an example, the case in which the media sensor 270 detects the feature value of the paper P being conveyed along the paper conveying path R1 from the manual sheet feed tray 221 to the image forming unit 230. More specifically, the present embodiment is described with reference to, as an example, the case where the media sensor 270 detects the feature value of the paper P from the paper P conveyed from the manual sheet feeding unit 220 along the paper conveying path R1 at a position between the feed roller 222 and the pull-out roller 223. In addition, the present embodiment is described with reference to, as an example, the case in which the CPU 110 determines the type of paper P on the basis of the feature value of the paper P detected by the media sensor 270.

The installation location of the media sensor 270 is not limited to the location illustrated in FIG. 1. For example, to detect the feature value of the paper P conveyed from the feed cassette 211, the media sensor 270 may detect the feature value of the paper P being conveyed at a position downstream of a merging point of the paper conveying paths R1 from the feed cassettes 211 to the image forming unit 230. The media sensor 270 that detects the feature value of the paper P being conveyed from the manual sheet feed tray 221 may be different from the media sensor 270 that detects the feature value of the paper P being conveyed from the feed cassette 211. Alternatively, a single media sensor 270 may detect the feature value of the paper P conveyed from each of the feed cassette 211 and the manual sheet feeding unit 220. For example, the media sensor 270 may detect the feature value of the paper P being conveyed, for example, at a position downstream of a merging point of the paper conveying path R1 from the feed cassette 211 to the image forming unit 230 and the paper conveying path R1 from the manual sheet feeding unit 220 to the image forming unit 230.

According to the present embodiment, determination of the type of paper by the CPU 110 on the basis of the result of detection of the feature value of paper by the media sensor 270 is also expressed as determination of the type of paper by using the media sensor 270 as appropriate.

While the basic operation performed by the image forming apparatus 100 according to the present embodiment has been described above, the above-described basic operation performed by the image forming apparatus 100 is only an example, and the basic operation is not limited thereto.

Description of Media Sensor

Figure 3:
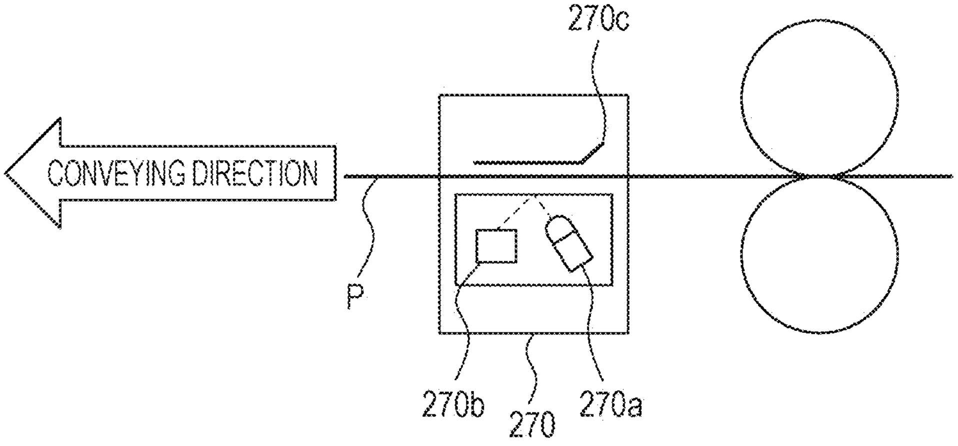
FIG. 3 illustrates the configuration of a media sensor.

FIG. 3 illustrates an example of the configuration of the media sensor 270. In the example illustrated in FIG. 3, the media sensor 270 includes a light emitting element 270*a* and a light receiving element 270*b*. The light emitting element 270*a* is, for example, a light emitting diode (LED). The light receiving element 270*b* is, for example, a photodiode.

The light emitting element 270*a* and the light receiving element 270*b* are installed so that the light receiving element 270*b* can detect the light emitted by the light emitting element 270*a* and reflected by the paper P. The light receiving element 270*b* detects the amount of light reflected by the paper P. The media sensor 270 further includes a guide unit 270*c* that guides the paper P to the conveying path inside of the media sensor 270.

The CPU 110 receives an input signal from the light receiving element 270*b* as the output value of the media sensor 270. The output value of the media sensor 270 varies in accordance with the feature value of the paper P (for example, the surface property and the basis weight). The CPU 110 can identify the feature value of the paper P on the basis of the output value of the media sensor 270 and can determine the type of paper P on the basis of the identified feature value. For example, the CPU 110 determines the type of paper P using a paper type database that stores information by which the type of paper P can be identified and the feature value of the paper P that are associated with each other. An example of information by which the type of paper P can be identified is at least one of the above-described name (type name) of the paper P and the category of the paper P. The CPU 110 identifies the feature value of the paper P on the basis of the output value of media sensor 270, reads the type of paper P associated with the identified feature value from the paper type database, and thus, determines the type of paper P.

Thereafter, the CPU 110 optimally controls the image forming speed and the target temperature of the fixing unit 234 in accordance with the determined type of paper P. As described above, according to the present embodiment, the CPU 110 determines the type of paper P using the media sensor 270, so that the user need not set the type of paper P consciously. Therefore, the image forming apparatus 100 according to the present embodiment has a mode in which the type of paper P is determined using the media sensor 270, and the print control parameters and the like are automatically set in accordance with the type of paper P (hereinafter, the mode is referred to as a “media auto-setting mode”). In addition, the image forming apparatus 100 according to the present embodiment has a mode in which the user manually sets the type of paper P to be used for printing (hereinafter, the mode is referred to as a “media manual setting mode”).

The user can preset one of the media auto-setting mode and the media manual setting mode for each of the feed cassettes 211 and the manual sheet feed tray 221 by operating the instruction/display unit 140. The default mode is, for example, the media auto-setting mode. A setting value indicating which one of the media auto-setting mode and the media manual setting mode is selected as the setting mode is stored in the RAM 130, for example.

While the configuration of the media sensor 270 according to the present embodiment has been described above, the above-described configuration of the media sensor 270 is only an example, and the configuration is not limited thereto. For example, the media sensor 270 may have a configuration obtained by combining an ultrasonic sensor, such as a piezoelectric element, with the light emitting element and the light receiving element and may have the configuration.

The method for setting one of the media auto-setting mode and the media manual setting mode and the processing performed by the image forming apparatus 100 in accordance with the setting are performed in the way described in Japanese Patent Laid-Open No. 2022-26815, for example. Therefore, a detailed description of the same part as described in Japanese Patent Laid-Open No. 2022-26815 is omitted here.

When the setting mode is the media auto-setting mode, the image forming apparatus 100 according to the present embodiment uses the media sensor 270 to determine the type of paper P to be used for printing. In contrast, when the setting mode is the media manual setting mode, the image forming apparatus 100 sets the type of paper P to be used for printing to the type of paper P manually set by the user.

Description of Setting for Paper Placed on Paper Feeding Unit

An example of the setting of the paper P placed on the paper feeding unit is described below. According to the present embodiment, for example, the type of paper P conveyed from the manual sheet feed tray 221 is determined using the media sensor 270. Therefore, the present embodiment is described with reference to, as an example, the case in which the setting is made for the paper P placed on the manual sheet feed tray 221. However, as described above, for example, the type of paper P conveyed from the feed cassette 211 may be determined using the media sensor. In this case, in the description below, the setting may be made for the paper P placed in the feed cassette 211 instead of or in addition to the manual sheet feed tray 221.

Figure 4A:
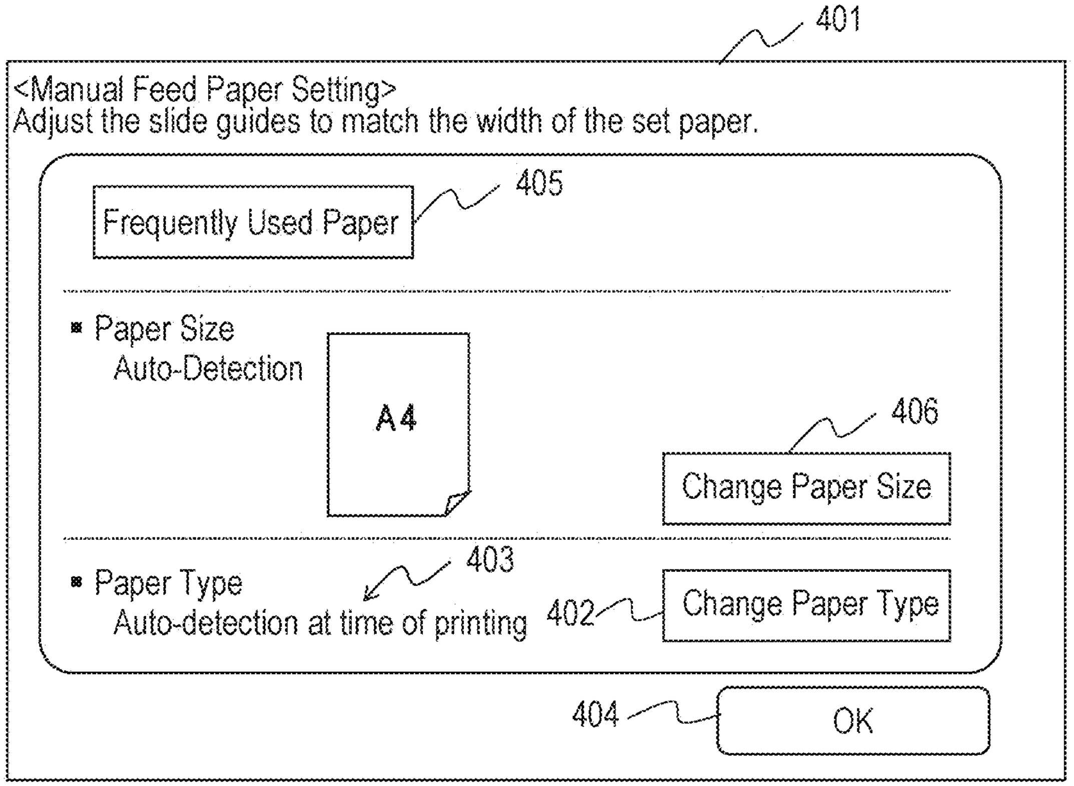
FIGS. 4A and 4B illustrate paper setting screens.
Figure 4B:
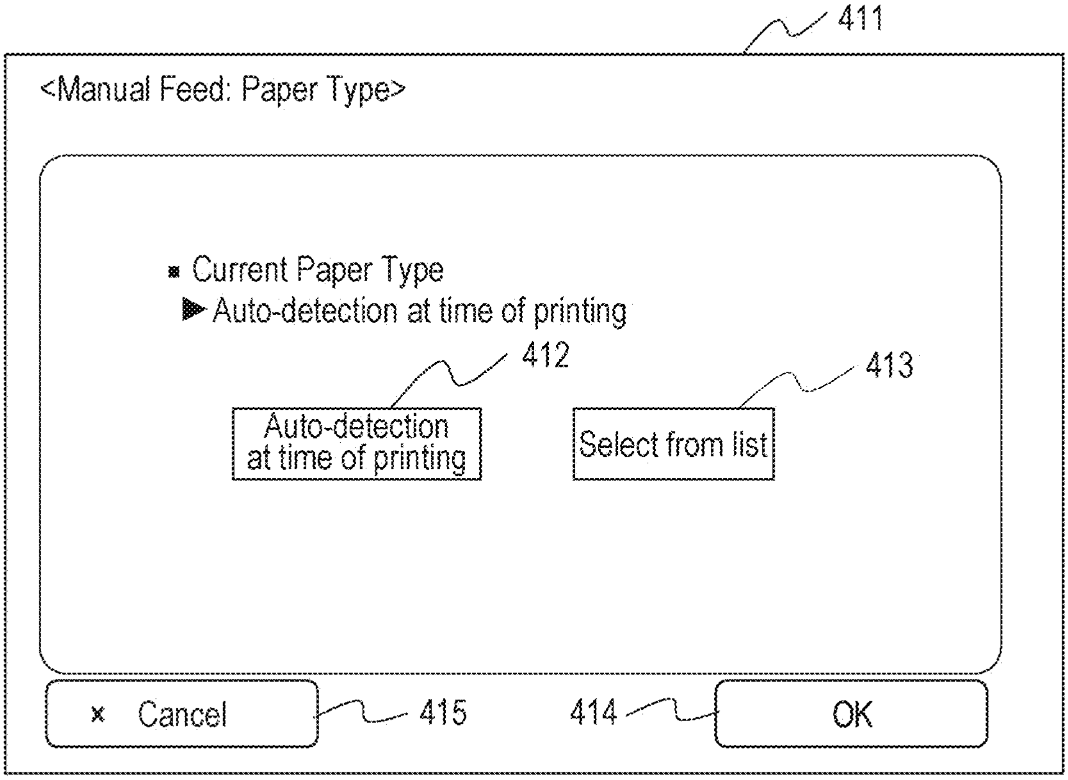

FIGS. 4A and 4B illustrate examples of the paper setting screens 401 and 411, respectively. The paper setting screens 401 and 411 illustrated in FIGS. 4A and 4B are displayed on the instruction/display unit 140, for example, by the CPU 110 executing a control program stored in the HDD 120.

FIG. 4A illustrates an example of the paper setting screen 401 displayed on the instruction/display unit 140 when the paper P is placed on the manual sheet feed tray 221. The placement of the paper P on the manual sheet feed tray 221 is detected, for example, by a sensor (not illustrated) provided in the manual sheet feed tray 221.

The user can set and change the size and type of paper by performing an operation on the paper setting screen 401 illustrated in FIG. 4A. The user can specify the type of paper by pressing a paper type change button 402. Information indicating the type of paper currently set is displayed in a paper type display field 403.

FIG. 4B illustrates an example of the paper setting screen 411 that is changed from the paper setting screen 401 illustrated in FIG. 4A after the paper type change button 402 is pressed. An auto-detect button 412 is a button pressed by the user when the user wants to determine the type of paper P using the media sensor 270. The select-from-list button 413 is a button that is pressed by the user when the user wants to select a desired type as the type of paper P.

Figure 5A:
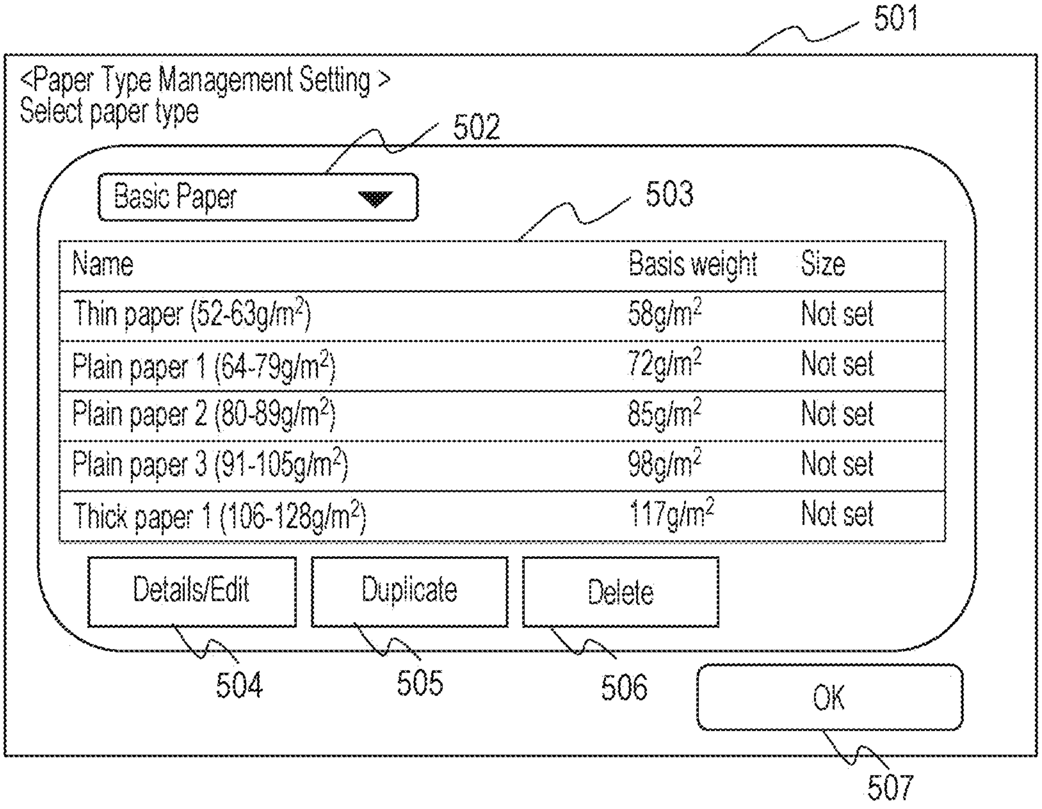
FIGS. 5A and 5B illustrate paper type list screens.
Figure 5B:
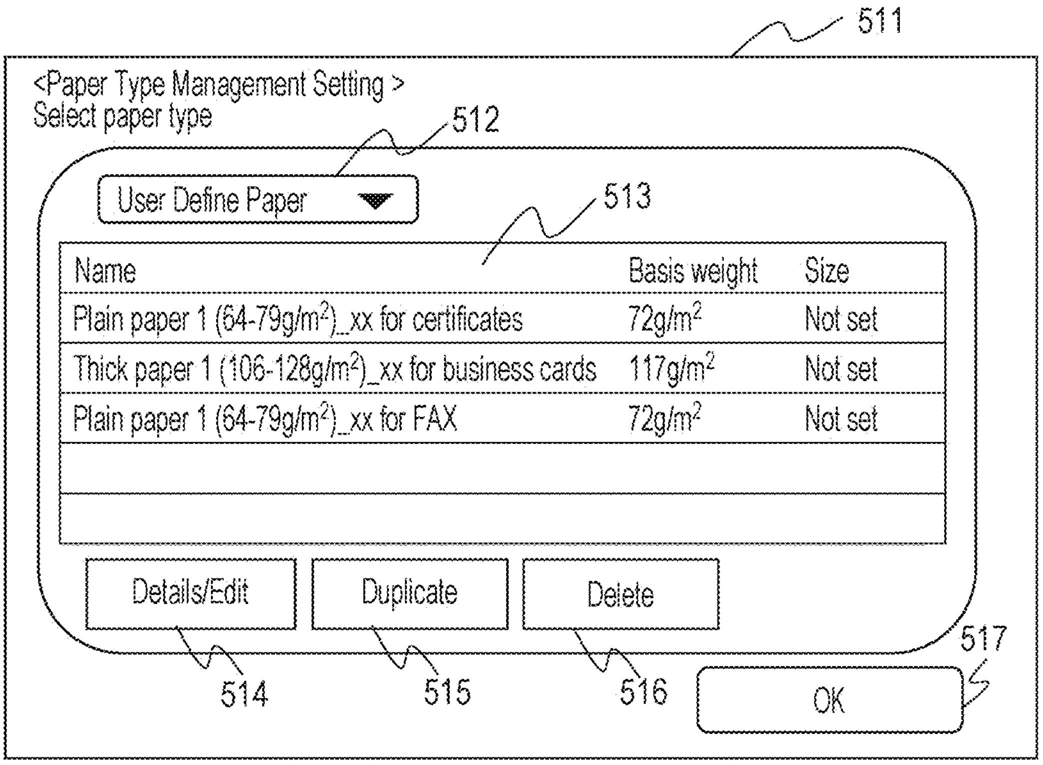

When the select-from-list button 413 is pressed, the CPU 110 displays a paper type list screen illustrated in FIG. 5A or 5B on the instruction/display unit 140. The user can select any type of paper P from among the candidates of the type of paper P displayed on the paper type list screen. The list of the types of paper P stored in the paper type database is displayed on the paper type list screen. In the example illustrated in FIG. 4B, the user either presses the auto-detect button 412 or presses the select-from-list button 413 and, thereafter, selects a type of paper. The user then presses an OK button 414. The CPU 110 then returns the paper setting screen 411 illustrated in FIG. 4B to the paper setting screen 401 illustrated in FIG. 4A.

When an OK button 404 is pressed by the user on the paper setting screen 401 illustrated in FIG. 4A, the CPU 110 stores, in the HDD 120, the setting information for the paper P placed on the manual sheet feed tray 221. The setting information for the paper P placed on the manual sheet feed tray 221 includes the setting information regarding the type of paper P selected by operating the auto-detect button 412 or the select-from-list button 413. When a cancel button 415 illustrated in FIG. 4B is pressed by the user, the CPU 110 returns the paper setting screen 411 illustrated in FIG. 4B to the paper setting screen 401 illustrated in FIG. 4A. In this case, even if an operation is performed on the auto-detect button 412 or the select-from-list button 413, the CPU 110 discards the information stored in response to the operation, as if the operation was not performed.

In FIG. 4A, a frequently-used-paper button 405 is a button that is pressed by the user when the user prints on user define paper that has been pre-registered by the user among existing user define paper. When the frequently-used-paper button 405 is pressed by the user, the CPU 110 displays a screen for selecting paper P used for printing (not illustrated) on the instruction/display unit 140. Printing is performed on the basis of the print control parameters registered for the paper P selected on the screen in the paper type database. The basic paper may also be selectable on the screen.

A paper size change button 406 is a button that is pressed by the user when selecting the size of the paper P. When the paper size change button 406 is pressed by the user, the CPU 110 displays a screen (not illustrated) for selecting the size of the paper P on the instruction/display unit 140. In addition to a size defined by the standard, a user-defined size can be selected on the screen.

Description of Paper Type List

FIGS. 5A and 5B illustrate an example of paper type list screens 501 and 511, respectively. The paper type list screens 501 and 511 illustrated in FIGS. 5A and 5B are displayed on the instruction/display unit 140, for example, by the CPU 110 executing the control program stored in the HDD 120.

Examples of the list of the types of paper P and the list of user define paper are described below with reference to FIGS. 5A and 5B.

According to the present embodiment, the paper type list is a list of types of paper P that is stored in the paper type database. The paper type list includes the basic paper and the user define paper. As used herein, the term “basic paper” refers to the type of paper P for which feature values, such as a basis weight and surface properties that can be used in the image forming apparatus 100, and print control parameters, such as a fixing temperature, are predefined by default. The term “user define paper” refers to the type of paper P that is set uniquely by the user. Unlike the basic paper, the print control parameters set for user define paper can be changed individually.

The present embodiment is described below with reference to, as an example, a case in which print control parameters for user define paper are generated on the basis of the print control parameters predefined for the basic paper. The print control parameters for the basic paper are stored in the paper type database. The print control parameters for the user define paper are added to the paper type database and are stored by the CPU 110.

FIG. 5A illustrates an example of the paper type list screen 501. The paper type list screen 501 illustrated in FIG. 5A displays the list of the types of paper P that can be selected by the user. The user can select one of the three options-basic paper, user define paper, and all, by operating a pull-down menu 502 illustrated in FIG. 5A. The CPU 110 reads the information regarding the paper P stored in the paper type database in accordance with the selection made via the pull-down menu 502 and displays the information in a paper list 503.

When basic paper is selected via the pull-down menu 502 as illustrated in FIG. 5A, the CPU 110 reads the information regarding the paper P corresponding to the basic paper among the papers P stored in the paper type database and displays the information in the paper list 503. The user selects a desired basic paper from among the types of paper P displayed in the paper list 503, and then, presses a duplicate button 505. Then, the CPU 110 generates new user define paper information on the basis of the information registered in the paper type database for the basic paper and registers the user define paper information in the paper type database. The new user define paper is given a new name. The new user define paper is assigned a category. For example, each of the types of paper P may be identified as either user define paper or basic paper on the basis of at least one of the name and the category. Registration of information regarding the new user define paper by pressing the duplicate button 505 is performed as described in, for example, Japanese Patent Laid-Open No. 2022-26815, and therefore, detailed description of the registration is omitted.

The user can view the details of the basic paper by selecting a desired basic paper from among the papers P displayed in the paper list 503 and then pressing a details/edit button 504. The feature values of the basic paper include, for example, the basis weight and the size. According to the present embodiment, the feature values of the basic paper cannot be changed. Therefore, even if the user selects any basic paper from among the types of paper P displayed in the paper list 503 and then presses the detail/edit button 504, the feature values and print control parameters of the basic paper cannot be changed. In addition, according to the present embodiment, the basic paper cannot be deleted.

Therefore, when basic paper is selected via the pull-down menu 502, a delete button 506 is grayed out so as not to be pressed. When an OK button 507 is pressed, the CPU 110 terminates display of the paper type list screen 501. When one of the papers P displayed in the paper list 503 is selected, printing is performed using the print control parameters corresponding to the type of paper P.

The paper type list screen 511 illustrated in FIG. 5B is a paper type list screen that is displayed when user define paper is selected via the pull-down menu 512. A paper list 513 displays the list of user define papers. The CPU 110 reads the information regarding user define papers registered in the paper type database and displays the information in the paper list 513. The user can change the information (for example, the basis weight and the size) regarding the user define paper already registered in the paper type database by selecting a desired user define paper from the types of paper P displayed in the paper list 513 and then pressing a details/edit button 514.

Furthermore, the user selects a desired user define paper from among the types of paper P displayed in the paper list 513, and then, presses a duplicate button 515. Then, the CPU 110 generates information regarding a new user define paper on the basis of the user define paper already registered in the paper type database and registers the user define paper information in the paper type database. The registration of the information regarding the new user define paper by pressing the duplicate button 515 is performed as described in, for example, Japanese Patent Laid-Open No. 2022-26815, and therefore, detailed description of the registration is omitted.

Alternatively, the user selects a desired user define paper from the types of paper displayed in the paper list 513, and then, presses a delete button 516. The CPU 110 then deletes the user define paper selected by the user from the paper type database. When an OK button 517 is pressed by the user, the CPU 110 terminates the display of the paper type list screen 511. When one of the papers P displayed in the paper list 503 is selected, printing is performed using the print control parameters corresponding to the type of paper P.

Description of Print Control Process at Time of Paper Type Detection

Figure 6:
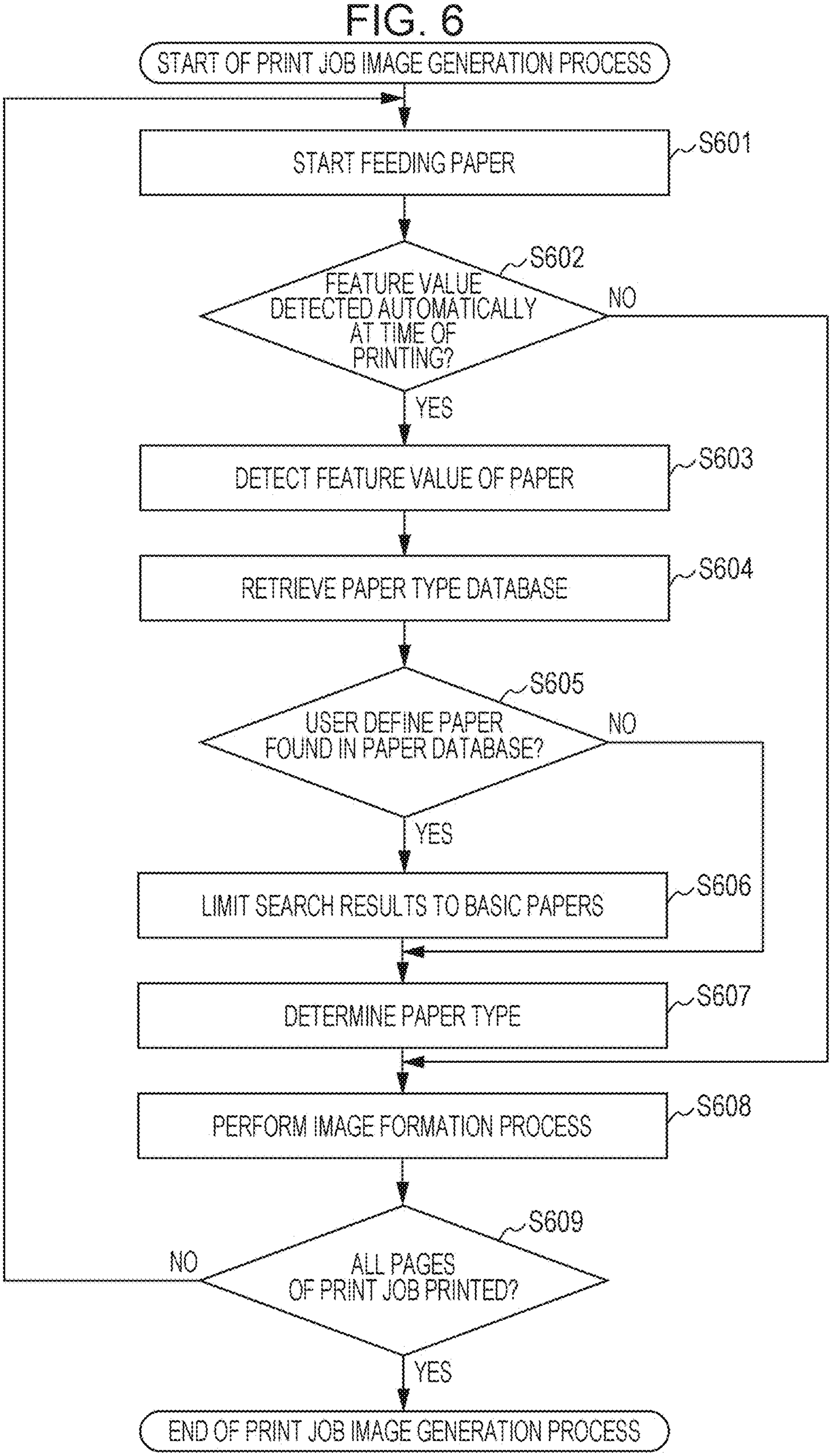
FIG. 6 is a flowchart of a print control process.

An example of a print control process performed at the time of paper type detection is described with reference to the flowchart illustrated in FIG. 6. Each of the steps of the flowchart in FIG. 6 is performed, for example, by the CPU 110 executing the control program that is read from the HDD 120 and is loaded into the RAM 130. For example, the flowchart starts when a print job is submitted to the image forming apparatus 100 after paper P is placed on the manual sheet feed tray 221 and, thereafter, the paper setting described with reference to FIGS. 4A and 4B is completed.

The print job may be, for example, a copy job in which it is specified to use a paper feeding unit that is set as a paper feeding unit that automatically detects the type of paper P at the time of printing by pressing the auto-detect button 412. Alternatively, the print job may be, for example, a PDL print job in which it is specified to use a paper feeding unit that is set as a paper feeding unit that automatically detects the type of paper P at the time of printing by a printer driver installed in an information processing terminal. The information processing terminal is a personal computer or the like connected to the image forming apparatus 100 via a network.

In S601, the CPU 110 instructs the printer engine 160 to start conveying the paper P placed on the paper feeding unit selected on the basis of the content of the print job submitted to the image forming apparatus 100.

In S602, the CPU 110 determines whether to automatically determine the feature value of the paper P that has been conveyed in S601 at the time of printing. For example, the CPU 110 may determine that the feature value of the paper P is automatically determined if the print job specifies the use of a paper feeding unit that is set as the paper feeding unit that automatically detects the feature value of the paper P. If, for example, the print job does not explicitly specify the type of paper P, the CPU 110 may determine that the feature value of paper P is automatically determined. If, for example, the above-described two conditions are satisfied, the CPU 110 may determine that the feature value of the paper P is automatically determined.

Whether the paper feeding unit automatically detects the feature value of the paper P may be determined, for example, using information prestored in the HDD 120. For example, the information as to whether the feature value of the paper P is to be automatically detected may be prestored in the HDD 120 as the setting information for the paper P placed on each of the paper feeding units. More specifically, as described above, the present embodiment is described with reference to, as an example, the case in which setting information regarding the type of paper P selected by operating the auto-detect button 412 or the select-from-list button 413 is stored in the HDD 120 as the setting information for the paper P placed on the manual sheet feed tray 221. Alternatively, information regarding the paper feeding unit (according to the present embodiment, the manual sheet feed tray 221) on which paper P that requires automatic detection of the feature value at the time of printing is placed may be prestored in the HDD 120.

If, as a result of the determination in S602, the feature value of the paper P is not automatically detected at the time of printing (No in S602), the process in S608 (described below) is performed without the processes in S603 to S607 being performed.

However, if the feature value of the paper P is automatically detected at the time of printing (Yes in S602), the process in S603 is performed.

In S603, the CPU 110 instructs the media sensor 270 to detect the feature value of the paper P. The media sensor 270 then detects the feature value of the paper P.

In S604, the CPU 110 retrieves the paper type database.

In S605, the CPU 110 determines whether the user define paper is registered in the paper type database retrieved in S604. The determination may be made, for example, on the basis of the paper categories registered in the paper type database. Alternatively, the determination may be made, for example, on the basis of the names of paper registered in the paper type database.

As a result of the determination, if the user define paper is not registered in the paper type database (No in S605), the process in S607 is performed without the process in S606 being performed. However, if the user define paper is registered in the paper type database (Yes in S605), the process in S606 is performed.

In S606, the CPU 110 limits the search results of the type of paper P in the paper type database retrieved in S604 to only basic papers. The basic papers are, for example, the types of paper P displayed in the paper list 503 illustrated in FIG. 5A.

In S607, the CPU 110 selects the type of paper corresponding to the feature value detected in S603 from among the basic papers that are determined to be searched in step S606 and determines the type of paper P. If, as a result of the determination in S605, no user define paper is registered in the paper type database (No in S605), the CPU 110 searches all types of paper P registered in the paper type database in S607.

FIG. 7 illustrates an example of the correspondence between the feature value of the paper P detected by the media sensor 270 and the type of paper P in tabular form. FIG. 7 illustrates the case in which the feature values are the surface property and the basis weight. The present embodiment is described with reference to, as an example, the case in which the correspondence illustrated in FIG. 7 is prestored in the HDD 120. In this case, the type of paper corresponding to the feature values detected in S603 is identified from the correspondence illustrated in FIG. 7.

In FIG. 7, row headers 701 indicate the basis weight, which indicates the thickness of paper P. In addition, column headers 702 indicate the surface property. In FIG. 7, two examples of the surface property are illustrated: plain paper (without a coating layer on the surface) and coated paper (with a coating layer on the surface). In FIG. 7, the type of paper P with lightly shaded background indicates that it is basic paper. The type of paper P with heavily shaded background indicates that it is user define paper.

The types of paper P displayed in the paper list 503 illustrated in FIG. 5A are basic paper. For example, if the basis weight classification is "106 to 128 g/m$^2$" and the surface property is "plain paper", a basic paper 703 of "Thick paper 1 (106 to 128 g/m$^2$)" is searched for. In addition, the types of paper P displayed in the paper list 513 illustrated in FIG. 5B are user define paper. The user define paper 704 of "Thick paper 1 (106 to 128 g/m$^2$)_xx for business cards" is paper generated from the basic paper 703 of "Thick paper 1 (106 to 128 g/m$^2$)". In this case, the basic paper 703 and the user define paper 704 are the types of paper P that belong to the same class as the types of paper P corresponding to the feature values (the basis weight and the surface property). In addition, a plurality of types of user define papers may belong to the same class, such as the user define paper 705 of "Plain paper 1 (64 to 79 g/m$^2$)_xx for certificate" and user define paper 706 for "Plain paper 1 (64 to 79 g/m$^2$)_xx for FAX".

For example, suppose that the basis weight detected by the media sensor 270 in S603 is in the range of "106 to 128 g/m$^2$" and the surface property is "plain paper". In this case, in S606, the CPU 110 excludes the user define paper 704 of "Thick paper 1 (106 to 128 g/m$^2$)_xx for business cards" from the search results. Therefore, in S607, the CPU 110 does not select the user define paper 704 of "Thick paper 1 (106 to 128 g/m$^2$)_xx for business cards" but selects the basic paper 703 of "Thick paper 1 (106 to 128 g/m$^2$)". In addition, for example, suppose that the basis weight detected by the media sensor 270 in S603 is "64 to 79 g/m$^2$" and the surface property is "plain paper". In this case, the CPU 110 does not select the user define paper 705 of "Plain paper 1 (64 to 79 g/m$^2$)_xx for certificates" and the user define paper 706 and "Plain paper 1 (64 to 79 g/m$^2$)_xx for FAX", but selects the basic paper 707 of "Plain paper 1 (64 to 79 g/m$^2$)".

The present embodiment is described below with reference to, as an example, the case in which search for only user define paper as the type of paper P corresponding to the feature values (in the example illustrated in FIG. 7, the basis weight and surface property) is avoided. In the example illustrated in FIG. 7, it is assumed that the case is avoided where the types of papers P in the same classes of both the basis weight and the surface property (that is, the types of papers P included in the same cell illustrated in FIG. 7) are only user define paper. That is, FIG. 7 illustrates the case where only basic paper or both basic paper and user define paper are included as the types of papers P that belong to the same classes of both basis weight and surface property. For this reason, when the type of paper P corresponding to the feature values detected in S603 is user define paper and it is determined in S605 that user define paper is included in the paper type database, the type of paper P is always determined in S607.

However, only user define paper may be searched for as the type of paper P corresponding to the feature values (the basis weight and surface property in the example illustrated in FIG. 7). In this case, for example, if only user define paper is retrieved as the type of paper P corresponding to the feature values (the basis weight and surface property in the example illustrated in FIG. 7), the print control parameters corresponding to the user define paper may be used. For example, if only a plurality of user define papers are retrieved as the type of paper P corresponding to the feature values (the basis weight and surface property in the example illustrated in FIG. 7), the print control parameters corresponding to a predetermined user define paper may be used.

Referring back to FIG. 6, in S608, the CPU 110 instructs the printer engine 160 to resume the paper feeding operation on the basis of the type of paper P determined in S607. The printer engine 160 performs an image forming process including formation of an image on the paper P and discharge of the paper P having the formed image, on the basis of the print control parameters corresponding to the type of paper P. The print control parameters corresponding to the type of paper P are identified, for example, by using the paper type database.

In S609, the CPU 110 determines whether all the pages of the print job have been printed after the image forming process including discharge of the paper P is completed in S608. If, as a result of the determination in S609, all the pages of the print job have not been printed (No in S609), the process in S601 is performed again. Then, the processes in S601 to S608 is performed for the next page. If, as a result of the determination in S609, all the pages of the print job have been printed, the processing of the flowchart ends.

As described above, according to the present embodiment, if there are more than one type of paper P corresponding to the feature values detected by the media sensor 270, the image forming apparatus 100 automatically selects one of the plurality of types of papers P. Thus, it can be prevented that the image forming apparatus 100 cannot determine the type of paper at the time of printing.

For example, as described in the present embodiment, when the type of paper P is determined using the media sensor 270, the type of paper P is identified from the paper type database prestored in the image forming apparatus 100 on the basis of the feature value of the paper P. In some cases, both the basic paper that is predefined and user define paper that is defined by the user may be registered in the paper type database as the types of paper P. Thus, if user define paper is included in the search results as the type of paper P corresponding to the feature value detected by the media sensor 270, the image forming apparatus 100 may not be able to determine the type of paper P at the time of printing, because there are a plurality of candidates for the paper P. In this case, for example, the plurality of candidates may be presented to the user, and the type of paper P selected by the user from among the plurality of candidates may be identified. However, this may reduce the usability for users who do not want to be aware of the type of paper P to be used.

In contrast, according to the present embodiment, the type of paper P to be estimated can be selected from among the basic papers on the basis of the feature value detected by the media sensor 270 even when not only basic paper but also user define paper is included in the paper type database. Thus, the knowledge and effort required for the user to determine the type of paper P when using any paper P can be reduced.

Second Embodiment

The second embodiment is described below. The present embodiment is described with reference to an example in which, in the first embodiment, information indicating which type is selected as the type of paper P is displayed when the paper feeding operation is resumed. As described above, the present embodiment differs from the first embodiment mainly in the display process when the paper feeding operation is resumed. Therefore, in the description of the present embodiment, parts similar to those in the first embodiment are identified by the same reference numerals as in FIGS. 1 to 7, and detailed description of the parts are omitted.

The present embodiment is described below with reference to, as an example, the case in which the CPU 110 displays information on the instruction/display unit 140 to make the user be aware that the type of paper P has not been determined before the type of paper P is determined in S607 illustrated in FIG. 6. In addition, as illustrated in FIGS. 8A to 8C, the present embodiment is described with reference to, as an example, the case in which, when the type of paper P is determined at S607 illustrated in FIG. 6, the CPU 110 displays information on the instruction/display unit 140 to make the user aware of the type of paper P that has been determined.

Figure 8A:
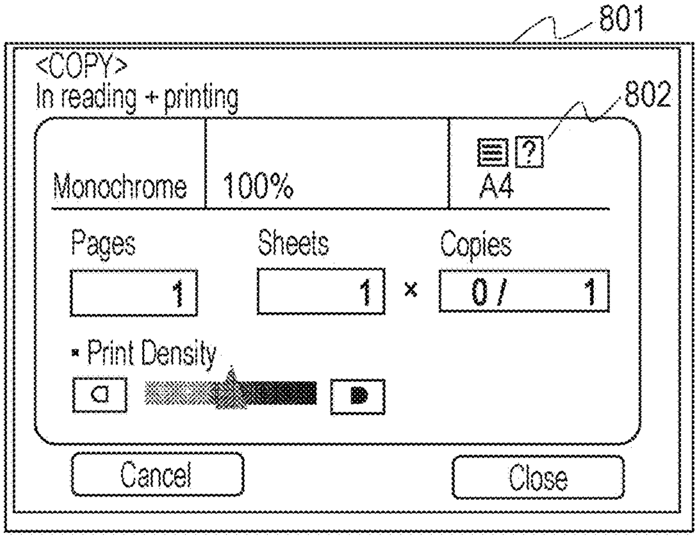
FIGS. 8A to 8C illustrate examples of a job status display screen.
Figure 8B:
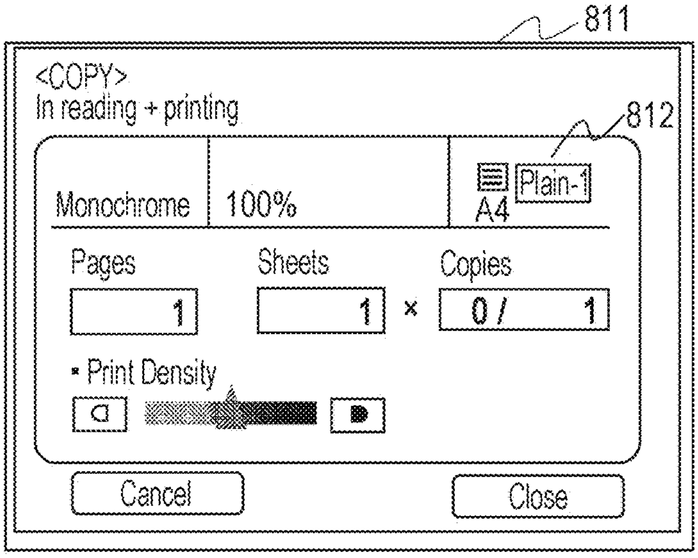
Figure 8C:
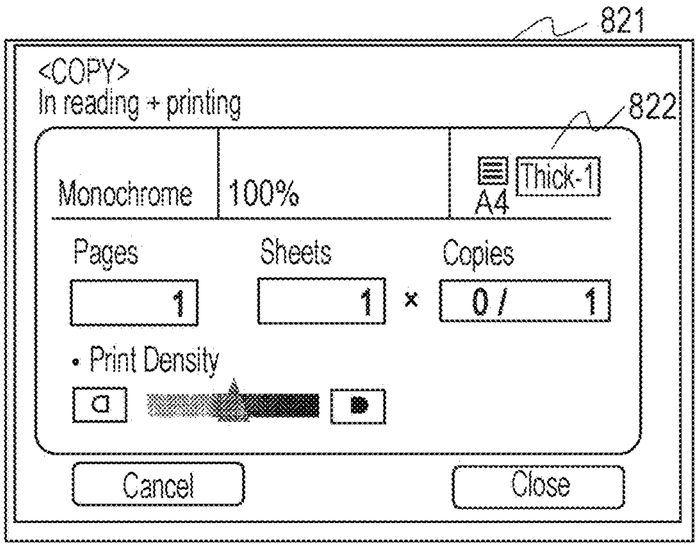

FIGS. 8A to 8C illustrate examples of job status display screens 801, 811, and 821, respectively. The job status display screens 801, 811, and 821 are displayed on the instruction/display unit 140 during printing. In the present example, the job including a printing operation is a copy job.

The job status display screen 801 illustrated in FIG. 8A is an example of a job status display screen that is displayed on the instruction/display unit 140 before the type of paper P is determined in S607 (until the process in S606 is completed). Before the type of paper P is determined in S607, the CPU 110 displays an icon 802 indicating that the type of paper P is unidentified is displayed on the job status display screen 801, as illustrated in FIG. 8A.

The job status display screens 811 and 821 illustrated in FIGS. 8B and 8C, respectively, are examples of job status display screens that are displayed on the instruction/display unit 140 after the type of paper P is determined in S607.

FIG. 8B illustrates the job status display screen 811 displayed when the type of paper P determined using the media sensor 270 is the basic paper 707 of "Plain paper 1 (64 to 79 g/m$^2$)". As illustrated in FIG. 8B, the CPU 110 displays, on the job status display screen 811, an icon 812 indicating that the type of paper P determined using the media sensor 270 is "Plain paper 1 (64 to 79 g/m$^2$)".

FIG. 8C illustrates the job status display screen 821 displayed when the type of paper P determined using the media sensor 270 is the basic paper 703 of "Thick paper 1 (106 to 128 g/m$^2$)". As illustrated in FIG. 8C, the CPU 110 displays, on the job status display screen 821, an icon 822 indicating that the type of paper P determined using the media sensor 270 is "Thick paper 1 (106 to 128 g/m$^2$)".

In FIGS. 8A to 8C, the case is illustrated in which an icon makes the user aware of the type of paper P determined using the media sensor 270, as an example. However, the information that makes the user aware of the type of paper P determined using the media sensor 270 is not limited to an icon. For example, a pop-up message on the job status display screens 801, 811, and 812 may be used to make the user aware of the type of paper P determined using the media sensor 270.

As described above, according to the present embodiment, the image forming apparatus 100 causes a display unit to display information to make the user aware of the type of paper P selected from among a plurality of types of papers P. Thus, the user can be aware of which type of paper P (according to the present embodiment, which basic paper) has been selected. As a result, for example, the user can reduce the knowledge and effort to determine the type of paper P when using any type of paper P. For example, when the user places paper P of an unknown type on the manual sheet feed tray 221, the user can be aware of the type of paper P. This enables the user to be aware whether the paper P of a wrong type is placed on the manual sheet feed tray 221. In addition, by displaying information to make the user aware of the type of paper P during the (partial or entire) period during which printing is being performed according to the type of paper P after the type of paper P is selected, the user can be aware of the type of paper P in real time.

The present disclosure can prevent the happening of the occasion where an image forming apparatus cannot determine the sheet type at the time of printing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-161601 filed Sep. 25, 2023, which is hereby incorporated by reference herein in its entirety.

What is claimed is:

1. An image forming apparatus comprising:

a detection unit configured to detect a feature value of a sheet being conveyed; and a selection unit configured to select a sheet type corresponding to the feature value detected by the detection unit, wherein in a case where a plurality of sheet types correspond to the feature value detected by the detection unit, the plurality of sheet types including a first sheet type having an attribution indicating a default sheet type and a second sheet type having an attribution indicating a sheet type registered by a user, the selection unit automatically selects, based on an attribution of a sheet type included in the plurality of sheet types, the first sheet type from the plurality of sheet types; and a printing unit configured to print on the conveyed sheet using a print control parameter corresponding to the first sheet type selected by the selection unit.

2. The image forming apparatus according to claim 1, further comprising:

a display processing unit configured to cause a display unit to display information indicating the sheet type selected by the selection unit, wherein the information is an icon indicating the sheet type selected by the selection unit.

3. The image forming apparatus according to claim 2, wherein the information is displayed in at least part of a time period in which processing for printing using the print control parameter corresponding to the type of sheet is performed after selection of the sheet type.

4. The image forming apparatus according to claim 1, further comprising:

a determination unit configured to determine whether a plurality of types of sheets correspond to the feature value detected by the detection unit are registered.

5. A method for controlling an image forming apparatus, comprising:

detecting a feature value of a sheet being conveyed;

selecting a sheet type corresponding to the detected feature value, wherein in a case where a plurality of sheet types correspond to the detected feature value, the plurality of sheet types including a first sheet type having an attribution indicating a default sheet type and a second sheet type having an attribution indicating a sheet type registered by a user, the first sheet type is automatically selected, based on an attribution of a sheet type included in the plurality of sheet types, from the plurality of sheet types; and printing on the conveyed sheet using a print control parameter corresponding to the selected first sheet type.

6. A non-transitory computer readable storage medium storing a program causing an image forming apparatus to perform a method, the method comprising:

detecting a feature value of a sheet being conveyed;

selecting a sheet type corresponding to the detected feature value, wherein in a case where a plurality of sheet types correspond to the detected feature value, the plurality of sheet types including a first sheet type having an attribution indicating a default sheet type and a second sheet type having an attribution indicating a sheet type registered by a user, the first sheet type is automatically selected, based on an attribution of a sheet type included in the plurality of sheet types, from the plurality of sheet types; and printing on the conveyed sheet using a print control parameter corresponding to the selected first sheet type.

* * * * *